United States Patent [19]

Katayama et al.

[11] Patent Number: 4,569,246

[45] Date of Patent: Feb. 11, 1986

[54] SHIFT LEVER OF A TRANSMISSION FOR AN AUTOMOBILE

[75] Inventors: Nobuaki Katayama; Kazuhito Ikemoto; Yoshio Ohta, all of Toyota, Japan

[73] Assignee: Toyota Jidosha Kogyo Kabushiki Kaisha, Tokyo, Japan

[21] Appl. No.: 637,709

[22] Filed: Aug. 6, 1984

Related U.S. Application Data

[63] Continuation of Ser. No. 333,065, Dec. 21, 1981, abandoned.

[30] Foreign Application Priority Data

Jul. 28, 1981 [JP] Japan ............................ 56-112714[U]

[51] Int. Cl.[4] ........................ B60K 20/00; G05G 9/00
[52] U.S. Cl. .................................. 74/473 R; 74/523; 403/225
[58] Field of Search ............... 74/470, 473 R, 473 P, 74/523, 543, 548; 403/221, 228, 225

[56] References Cited

U.S. PATENT DOCUMENTS

| | | | |
|---|---|---|---|
| 315,287 | 4/1885 | Hobart | 403/221 |
| 1,778,503 | 10/1930 | Lord | 403/228 |
| 1,822,026 | 9/1931 | Guy | 403/221 |
| 2,363,362 | 11/1944 | Rideout | 403/220 |
| 2,428,932 | 10/1947 | Fawick | 403/228 |
| 2,555,347 | 6/1951 | Lee | 403/225 |
| 2,583,947 | 1/1952 | Keetch | 403/225 |
| 2,767,528 | 10/1956 | Tocci-Gilbert | 403/221 |
| 3,329,453 | 7/1967 | Patton | 403/221 |
| 3,693,467 | 9/1972 | Oehl | 74/523 |
| 3,800,909 | 4/1974 | Duncanson et al. | 74/523 |
| 4,090,746 | 5/1978 | Harkins et al. | 403/225 |
| 4,092,078 | 5/1978 | Klotz et al. | 403/221 |
| 4,158,511 | 6/1979 | Herbenar | 403/228 |

FOREIGN PATENT DOCUMENTS

| | | | |
|---|---|---|---|
| 1117113 | 2/1956 | France | 403/221 |
| 1346182 | 11/1963 | France | 403/221 |

Primary Examiner—Kenneth J. Dorner
Attorney, Agent, or Firm—Parkhurst & Oliff

[57] ABSTRACT

The shift lever of a transmission is comprised of a first shift lever having a cylindrical portion for mounting a grip, and a rod-like second shift lever inserted into the cylindrical portion of the first shift lever. In the space defined between the cylindrical portion of the first shift lever and the second shift lever, there are packed a plurality of soft rubber rings and at least one hard rubber rings. The soft rubber rings serve to diminish the propagation of the vibration through the second shift lever to the first shift lever. The hard rubber ring is bonded onto one of the peripheral surfaces of the first and the second shift lever in radially spaced apart relation to the other of the peripheral surfaces of the first and the second shift lever and serves to prevent an excessive bending of the first shift lever relative to the second shift lever during the operation of the shift lever.

4 Claims, 10 Drawing Figures

(a)

(b)

SHIFT LEVER OF A TRANSMISSION FOR AN AUTOMOBILE

This is a continuation of application Ser. No. 333,065 filed Dec. 21, 1981 now abandond.

BACKGROUND OF THE INVENTION

This invention relates to a shift lever of a transmission for an internal combustion engine in an automobile.

Traditionally, as is well known in the art, transmissions for an internal combustion engine are classified as a manual transmission and an automatic transmission. In a manual transmission, a shift and select operations are carried out by a shift lever. The shift lever is composed of a first shift lever having a cylindrical portion and a rod-like portion which are coaxial each other, and a rod-like second shift lever having a smaller diameter than the cylindrical portion of the first shift lever. The upper end portion of the second shift lever is inserted into the cylindrical portion of the first shift lever by a predetermined length. The lower end portion of the second shift lever is fixed to a shift lever retainer provided in an extension housing of the transmission. A grip is fitted to the upper end of the rod-like portion of the first shift lever. During engine operation, the extension housing may vertically vibrate, which may cause sizzle vibration and sizzle noise of the shift lever. In the case of slow accelaration from a constant engine speed, noise may be generated by torsional vibration due to play in a driving system, or which noise is the resonance noise occurring from twist of drive line and is called "Jara" noise, and this "Jara" noise may be propagated through the shift lever into an automotive compartment.

Traditionally, in order to reduce such sizzle vibration and sizzle noise of the shift lever, and such "Jara" noise propagated through the shift lever into the automotive compartment, shock absorbing rubber rings are packed in the annular space defined by the cylindrical portion of the first shift lever and the inserted portion of the second shift lever into the cylindrical portion at the upper and lower end portions thereof. However, unless the spring constant of the shock absorbing rubbers is considerably reduced, it may be difficult to minimize the propagation of the sizzle vibration, sizzle noise and "Jara" noise of the shift lever into the automotive compartment. In this case, if the spring constant of the shock absorbing rubbers is extremely reduced, the durability of the shift lever decreases, and during the operation of the shift lever, the first shift lever is greatly bent relative to the second shift lever, thereby causing an operation feeling of the shift lever to be remarkably made worse.

SUMMARY OF THE INVENTION

It is an object of the present invention to provide a shift lever which remarkably reduces sizzle vibration and sizzle noise.

It is another object of the present invention to provide a shift lever whereby the propagation of "Jara" noise into an automotive compartment is reduced.

It is still another object of the present invention to provide a shift lever which hardly bends during the shift operation and improves an operation feeling of the shift lever.

In the present invention, a predetermined length of the second shift lever is inserted into the cylindrical portion of the first shift lever. In the annular space defined by the cylindrical portion of the first shift lever and the inserted portion of the second shift lever into the cylindrical portion, a first elastic material such as a soft rubber is disposed and bonded onto the peripheral surfaces of both the inserted portion and the cylindrical portion, and a second elastic material such as a hard rubber is bonded onto either inner peripheral surface of the cylindrical portion of the first shift lever or outer peripheral surface of the inserted portion of the second shift lever, thereby defining an annular narrow clearance between either peripheral surface and the elastic material.

Various general and specific objects, advantages and aspects of the invention will become apparent when reference is made to the following detailed description considered in conjunction with the accompanying drawings.

DETAILED DESCRIPTION OF THE PREFERRED EMBODIMENTS

Figure 1:
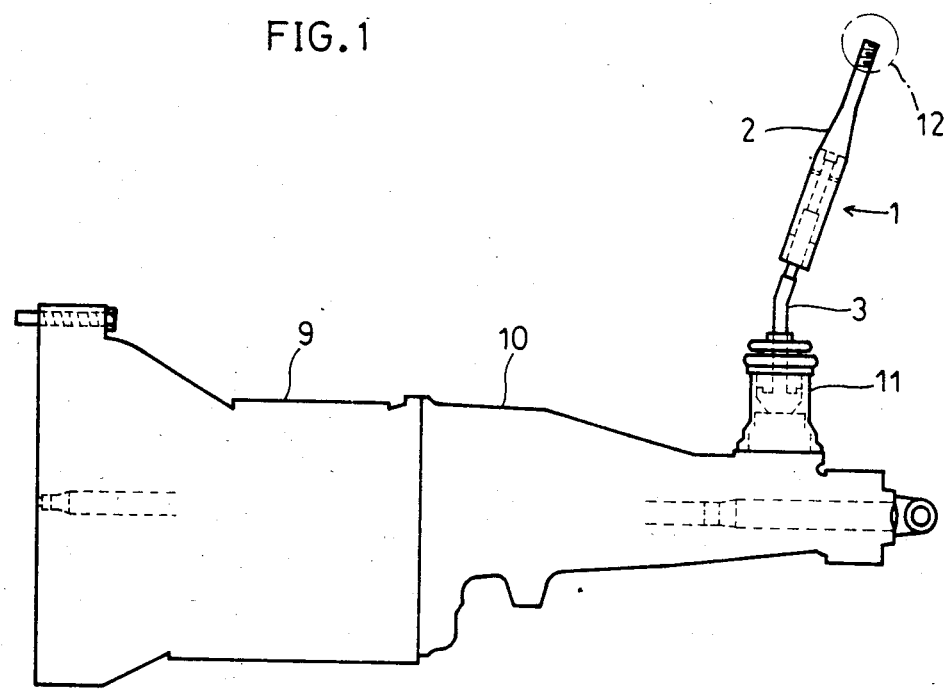
FIG. 1 shows a schematic illustration of the shift lever mounted in an extension housing of a transmission according to the present invention.
Figure 2:
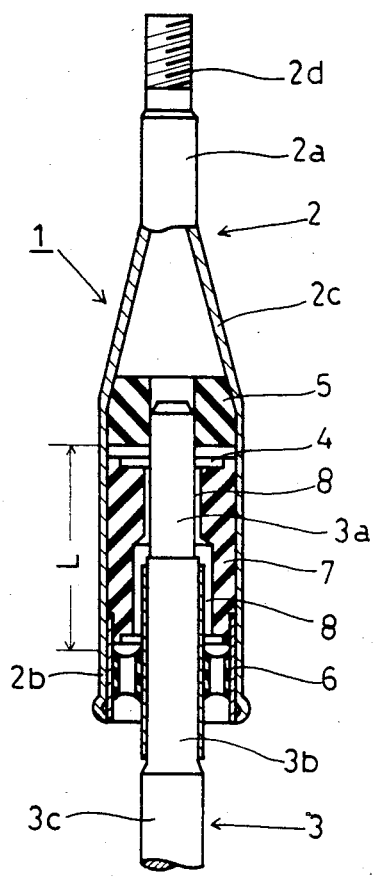
FIG. 2 is a vertical sectional view of the first preferred embodiment of the invention.

Referring now to FIGS. 2–5, a shift lever 1 has a first shift lever 2 and a second shift lever 3. The first shift lever 2 is comprised of a rod-like portion 2a, a hollow cylindrical portion 2b coaxial with the rod-like portion 2a and a conical portion 2c connecting the rod-like portion 2a with the cylindrical portion 2b. The upper end of the rod-like portion 2a is threaded to form a male screw 2d. The second shift lever 3 is a circular rod, the diameter of which is smaller than that of the cylindrical portion 2b of the first shift lever 2, and is composed of three portions which differ in diameter, that is, a smaller diameter portion 3a, a medium diameter portion 3b and a larger diameter portion 3c. The whole length of the smaller diameter portion 3a and a greater part of the medium diameter portion 3b are inserted into the cylindrical portion 2b of the first shift lever 2. Hereinafter this portion will be referred to as an inserted or end portion of the second shift lever 3. In an annular space 4 defined between the cylindrical portion 2b of the first shift lever 2 and the smaller diameter portion 3a as well as the medium diameter portion 3b of the second shift lever 3, a soft (i.e., relatively low spring constant) rubber ring 5 (a first vibration damping elastic member) is packed and bonded onto both the outer peripheral surface of the upper end portion of the smaller diameter portion 3a and the inner peripheral surface of the cylindrical portion 2b. Similarly, a ring-like soft rubber assembly (a second elastic vibration damping member) 6 is packed into the space 4 at the lower end portion of the cylindrical portion 2b. The rubber assembly 6 is comprised of a steel inner tube 6a, a steel outer tube 6b coaxial with the inner tube 6a and a soft rubber ring 6c bonded onto the peripheral surfaces of both tubes 6a and 6b, and packed into an annular space between the tubes 6a and 6b. The outer tube 6b is closely fitted with an inner peripheral surface of the cylindrical portion 2b of the first shift lever 2 and the inner tube 6a is closely fitted with an outer peripheral surface of the medium diameter portion 3b of the second shift lever 3. A through-hole 6d is provided in the soft rubber ring 6c, in order to reduce a spring constant with respect to that of the first and second elastic members) of the rubber assembly 6 if desired. A hard (i.e. relatively high spring constant) rubber ring third elastic vibration damping numbers 7 is disposed in the annular space 4 between the cylindrical portion 2b having an axial length L defined from the rubber ring 5 to the rubber ring 6c of the rubber assembly 6 and the second shift lever 3. There is provided an annular narrow clearance 8 between the rubber ring 7 and the smaller diameter portion 3a as well as the medium diameter portion 3b. The rubber ring 7 is closely fitted with the inner peripheral surface of the cylindrical portion 2b of the first shift lever 2. The rubber ring 7 is disposed in spaced apart relation from the rubber rings 5 and 6c.

The larger diameter portion 3c of the second shift lever 3 is curved at the lower portion thereof and its lower end is mounted to the shift lever retainer 11 fitted to the extension housing 10 of the transmission 9 at the lower end so as to permit the inclination in all directions. A grip 12 is threadedly engaged with the male screw 2d of the first shift lever 2.

During engine operation, the extension housing 10 will vertically vibrate and the second shift lever 3 will also vibrate in its axial direction or vertically. However, since the vibration of the second shift lever 3 may be diminished by the damping action of the soft rubber rings 5 and 6c, the vibration of the first shift lever 2 is extremely diminished. Accordingly, the sizzle vibration and sizzle noise due to the shift lever 1 can be reduced and the propagation of the "Jara" noise into the automotive compartment can be effectively avoided.

Figure 3:
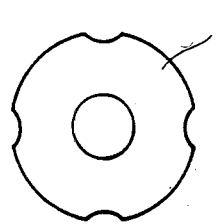
FIG. 3(a) is an elevational view of the essential part shown in FIG. 2.
FIG. 3(b) is a side sectional view of FIG. 3(a)
Figure 3:
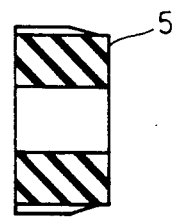
Figure 4:
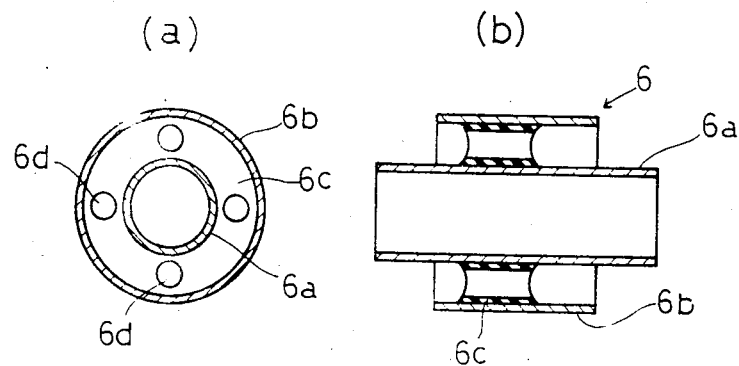
FIG. 4(a) is an elevational view of the another essential part shown in FIG. 2.
FIG. 4(b) is a side sectional view of FIG. 4(a)
Figure 5:
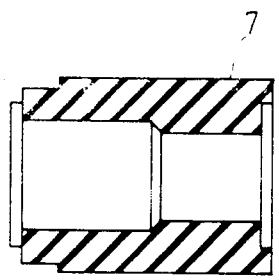
FIG. 5 is a side sectional view of the still another essential part shown in FIG. 2.

When the shift lever 1 is operated by moving the grip 12 by hand, that is, shifted and selected, both the rubber rings 5 and 6care deformed. However, since the force acting on the rubber ring 5 is greater than that acting on the rubber ring 6c, the rubber ring 5 is more greatly deformed than the rubber ring 6c. As a result, the smaller diameter portion 3a of the second shift lever 3 is brought into contact with the rubber ring 7 at the portion adjacent to the rubber ring 5. Accordingly, the first shift lever 2 is tilted relative to the second shift lever 3 until the smallerdiameter portion 3a comes to contact with the rubber ring 7. But, the first shift lever 2 is hardly tilted relative to the second shift lever 3 because of the hardness of the rubber ring 7 after the rubber ring 7 contacted with the smaller diameter portion 3a of the second shift lever 3. The angle of inclination of the first shift lever 2 relative to the second shift lever 3 can be set to be small by making the clearance 8 to be small, causing the operation feeling of the shift lever 1 to be improved as compared to the conventional shift lever. In the modification of the shift lever structure, the rubber ring 7 may be bonded to the inserted portion of the second shift lever 3 and the clearance 8 may be defined between the rubber ring 7 and the cylindrical portion 2b. The rubber ring 5 may be formed without the recesses as shown in FIG. 3.

Figure 6:
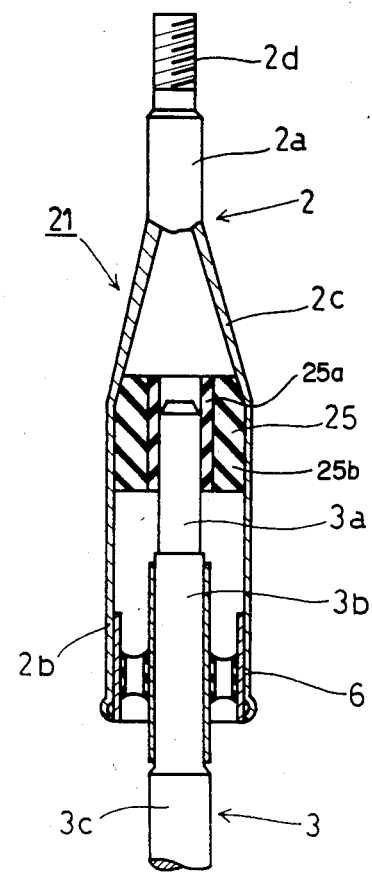
FIG. 6 is a vertical sectional view of the second preferred embodiment of the invention.
Figure 7:
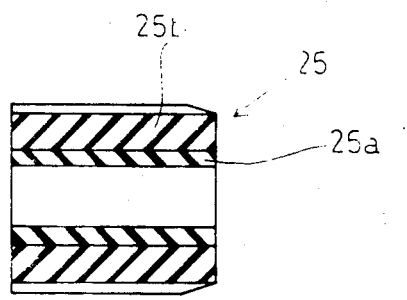
FIG. 7 is a side sectional view of the essential part shown in FIG. 6.

Referring to FIGS. 6 and 7, there is shown a shift lever 21 of the second embodiment according to the present invention. Similar reference numbers are utilized to describe similar components in the first preferred embodiment, omitting the explanation of such components. In comparison to the shift lever 1 in FIG. 1, the shift lever 21 is not provided with the rubber ring 7. The rubber ring 25 corresponding to the rubber ring 5 of the shift lever 1 is included in the shift lever 21 and is formed of a soft rubber inner ring 25a bonded to a hard rubber outer ring 25b. To effectively diminish the vertical or axial vibration of the first shift lever 2, the volume of the inner ring 25a is preferably made equal to the volume of the rubber ring 5 in FIG. 1. As a result, the axial length of the rubber ring 25 is greater than that of the rubber ring 5.

In the shift and select operations of the shift lever 21, the first shift lever 2 is slightly tilted relative to the second shift lever 3 because of the softness of the inner ring 25a, but the hard rubber outer ring 25b instantaneously shows a resilient (i.e., secondary vibration damping) effect to prevent an excessive inclination of the first shift lever 2. Accordingly, the operation feeling of the shift and select operations is not impaired at all. Since the vertical vibration of the second shift lever 3 can be diminished by the action of the inner ring 25a of the rubber ring 25 and the rubber assembly 6, the propagation of the sizzle vibration and sizzle noise to the first shift lever 2 can be reduced and the propagation of the "Jara" noise through the shift lever 21 into the automotive compartment can be also reduced. In the second preferred embodiment, the inner ring 25a and the outer ring 25b may be made of a hard rubber and a soft rubber, respectively.

Figure 8:
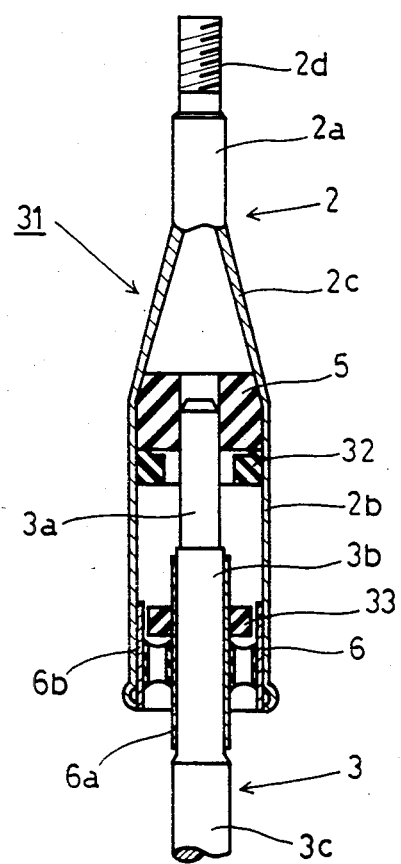
FIG. 8 is a vertical sectional view of the third preferred embodiment of the invention.

Referring to FIG. 8, there is shown a shift lever 31 of the third embodiment according to the present invention. Similar reference numbers are utilized to describe similar components in the first preferred embodiment, omitting the explanation of such components. In comparison to the shift lever 1 in FIG. 1, the shift lever 31 is not provided with the rubber ring 7. The rubber ring 5 and the rubber assembly 6 are provided with hard rubber rings 32 and 33, respectively. In FIG. 8, the hard rubber ring 32 is bonded to the inner peripheral surface of the cylindrical portion 2b of the first shift lever 2, but it may be bonded to the outer peripheral surface of the smaller diameter portion 3a of the second shift lever 3. In a similar fashion, the hard rubber ring 33 may be bonded to the inner peripheral surface of the outer tube 6b of the rubber assembly 6 instead of being bonded to the outer peripheral surface of the inner tube 6a of the rubber assembly 6.

In the shift and select operations of the shift lever 31, the rubber ring 5 and the rubber assembly 6 effectively diminish the propagation of the vibration through the second shift lever 3 and the first shift lever 2. Furthermore, the hard rubber rings 32 and 33 effectively prevent an excessive bending of the first shift lever 2 to the second shift lever 3. As shown in FIG. 8, the contact area of the soft rubber ring 5 and the hard rubber ring 32 is made small owing to the difference in the spring constant of both rubber rings 5 and 32 so as to increase the durability of the soft rubber ring 5.

Having thus described the preferred embodiments of the invention it should be understood that numerous structural modifications and adaptations may be restored to without departing from the spirit of the invention.

What is claimed is:

1. A shift lever means for a transmission for an automobile comprising:
(a) a first shift lever having a hollow portion at one end of said shift lever;
(b) a second shift lever having a first end portion at one end of said second shift lever, the inner-diameter of said hollow portion of said first shift lever being larger than the outer-diameter of said end portion of said second shift lever, said first end portion of said second shift lever being located inside said hollow portion of said first shift lever, and said second shift lever having a second end portion portion linked to said transmission;
(c) first and second elastic vibration damping member having a relatively low spring constant, both said first and second elastic damping members abutting both an outer peripheral surface of said second shift lever and an inner peripheral surface of said first shift lever; said first elastic damping member being disposed near an upper end of said end portion of said second shift lever and said second elastic damping member being disposed near a lower end of said end portion of said second shift lever;
(d) a third elastic vibration damping member having a spring constant which is high relative to the spring constant of said first and second elastic damping members, said third elastic damping member abutting said inner peripheral surface of said first shift lever and not said outer peripheral surface of said second shift lever, thus forming a predetermined clearance between said third elastic damping member and said outer peripheral surface of said second shift lever, said third elastic damping member being disposed between said first elastic damping member and said second elastic damping member;
wherein initial relative vibrational and gear-shifting movement between said first and second shift levers compresses substanitally only said first and second elastic damping members, and further relative vibrational and gear shifting movement between said first and second shift levers compresses all of said first, second and third elastic damping members.

2. A shift lever means for a transmission for an automobile as set forth in claim 1, wherein said third elastic damping member comprises an upper part and a lower part, said upper part and lower part of said third elastic damping member being disposed in the vicinity of said first elastic damping member and said second elastic damping member, respectively.

3. A shift lever means for a transmission for an automobile as set forth in any one of claims 1 and 2, wherein said first elastic damping comprises a cylindrical elastic block having plural axial grooves on its outer peripheral surface.

4. A shift lever means for a transmission for an automobile as set forth in any one of claims 1 and 2, wherein said second elastic damping member comprises, concentrically arranged, an inner tube, an outer tube and a cylindrical elastic block disposed between said inner and outer tubes, wherein said cylindrical elastic block comprises plural axial through holes.

* * * * *

UNITED STATES PATENT AND TRADEMARK OFFICE
CERTIFICATE OF CORRECTION

PATENT NO. : 4,569,246
DATED      : February 11, 1986
INVENTOR(S) : Nobuaki Katayama; Kazuhito Ikemoto; Yoshio Ohta It is certified that error appears in the above-identified patent and that said Letters Patent is hereby corrected as shown below:

In the "Assignee", "Tokyo" is to be changed to --Aichi--

At col. 3, lines 17 & 18, "constant) rubber ring third elastic vibration damping numbers 7" is to be changed to --constant with respect to that of the first and second elastic members) rubber ring (third elastic vibration damping member) 7--

At col. 5, line 18, "member" is to be changed to --members--.

Signed and Sealed this

First Day of July 1986

[SEAL]

Attest:

DONALD J. QUIGG

Attesting Officer

Commissioner of Patents and Trademarks